US007506059B2

(12) United States Patent
Mulligan

(10) Patent No.: US 7,506,059 B2
(45) Date of Patent: Mar. 17, 2009

(54) MOBILE CLIENT PROVISIONING WEB SERVICE

(75) Inventor: Michael Mulligan, Tampere (FI)

(73) Assignee: Nokia Corporation, Espoo (FI)

( * ) Notice: Subject to any disclaimer, the term of this patent is extended or adjusted under 35 U.S.C. 154(b) by 880 days.

(21) Appl. No.: 10/036,058

(22) Filed: Oct. 26, 2001

(65) Prior Publication Data

US 2003/0084177 A1 May 1, 2003

(51) Int. Cl.
G06F 15/16 (2006.01)
(52) U.S. Cl. .................... 709/230; 455/418; 455/456.6; 717/174
(58) Field of Classification Search ................. 455/418, 455/466, 433, 414, 419, 456.6; 709/224, 709/226, 218, 230; 379/201.03; 345/747; 717/174
See application file for complete search history.

(56) References Cited

U.S. PATENT DOCUMENTS

| 6,047,194 | A | 4/2000 | Andersson ................... 455/466 |
| 6,269,244 | B1* | 7/2001 | Alperovich et al. .......... 455/433 |
| 6,275,693 | B1 | 8/2001 | Lin et al. .................... 455/414 |
| 6,301,484 | B1* | 10/2001 | Rogers et al. ................ 455/466 |
| 6,363,249 | B1* | 3/2002 | Nordeman et al. ........... 455/418 |
| 6,453,162 | B1 | 9/2002 | Gentry ........................ 455/433 |
| 6,466,779 | B1 | 10/2002 | Moles et al. ................. 455/410 |
| 6,615,038 | B1* | 9/2003 | Moles et al. ................. 455/418 |
| 6,647,260 | B2* | 11/2003 | Dusse et al. ................. 455/419 |
| 2002/0054090 | A1* | 5/2002 | Silva et al. ................... 345/747 |
| 2003/0013434 | A1* | 1/2003 | Rosenberg et al. .......... 455/414 |
| 2003/0055912 | A1* | 3/2003 | Martin et al. ................ 709/218 |
| 2003/0207685 | A1* | 11/2003 | Rankin ........................ 455/433 |

FOREIGN PATENT DOCUMENTS

EP 1 043 906 A2 10/2000
WO WO 00/22794 4/2000

OTHER PUBLICATIONS

Scott Seely "Web Service description and Discovery Using UDDI, Part II", Microsoft Corporation, Oct. 17, 2001.*
Nirmal K. Mukhi, "Web service invocation sans SOAP How WSIF scores over the current client programming models for Web services", IBM Sep. 1, 2001.*
Tony Miranzadeh, Provisioning Next-Generation Wireless Services, 2000.*

* cited by examiner

Primary Examiner—Jungwon Chang
(74) Attorney, Agent, or Firm—Hollingsworth & Funk, LLC

(57) ABSTRACT

A system and method for provisioning mobile clients on a network for use of network service applications via a provisioning Web service. At least one mobile terminal is coupled to at least one network service via the mobile client provisioning Web service. The provisioning Web service provides a single point of interface to the network service for provisioning the mobile terminal. The mobile terminal is provisioned by the provisioning Web service for use of at least one application provided by the network services where the provisioning includes at least configuring the mobile terminal for use of the application, and delivering the application to the mobile terminal.

3 Claims, 6 Drawing Sheets

MOBILE CLIENT PROVISIONING WEB SERVICE

FIELD OF THE INVENTION

The present invention relates generally to network communications systems, and more particularly, to a system and method for provisioning mobile clients on a network via a provisioning Web service.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. The proliferation of local, regional, and global networks such as the Internet has availed a sea of information to society. These networking technologies have expanded to increasingly include wireless and mobile technologies. Through these networks, information can be downloaded to desktop systems, wireless systems, mobile systems, etc. For example, information available via the Internet can now be downloaded onto mobile wireless units, such as cellular telephones, personal digital assistants (PDAs), laptop computers, etc. One such technology facilitating the transfer of Internet content to and from wireless devices is the Wireless Application Protocol (WAP), which integrates the Internet and other networks with wireless network platforms. Generally, WAP is a set of protocols that accounts for characteristics and functionality of both Internet standards and standards for wireless services. It is independent of wireless network standards, and is designed as an open standard. WAP bridges the gap between the wireline Internet paradigm and the wireless domain, to allow wireless device users to enjoy the benefits of the Internet across both platforms.

Second generation wireless service, often referred to as 2G wireless service, is a current wireless service based on circuit-switched technology. 2G systems, such as Global System for Mobile communications (GSM) and Personal Communications Services (PCS), use digital radio technology for improved quality and a broader range of services over first generation mobile technologies. 3G, or third generation, refers to a set of digital technologies that promises improvements in capacity, speed and efficiency by deploying new packet-based transmission methodologies between terminals and the network. Users of 3G devices and networks will have access to multimedia services such as video-on-demand, video conferencing, fast web access and file transfer. Existing and future services are, and will continue to be, provided by network service operators who make services and applications available to mobile device users via the network.

With the introduction of new mobile services such as WAP, Multimedia Messaging Service (MMS), calendar and contact synchronization, as well as a multitude of other possibilities, the number of servers and portals providing services for mobile Internet terminals continues to expand. Further, there is an increasing number of features associated with these services, such as support for multimedia, location-based services, electronic payments, etc. Thus, new terminals supporting new network technologies and mobile Internet services will continuously be taken into use, often as replacement devices for existing subscribers. The new terminals will increasingly require new or updated configuration settings before they can successfully connect to the network servers that offer applications over the network.

However, mobile terminals are by nature limited devices. They typically have limited memory, storage, and processing, capabilities. Therefore, mobile devices do not include all of the components required to access new or upgraded services that may be available on the network. When a mobile user wants to utilize new services available on the network, the terminal must be configured to use those new services. Configuring a terminal to use a service on a network is generally referred to as "provisioning" the terminal. Provisioning may be performed upon initial setup of a mobile device, or may also be performed to upgrade services and applications already being used at that mobile device.

One traditional provisioning methodology in use today requires that a retail establishment provision the terminal for the user. This, however, is inconvenient for the user. Further, if the user decided to purchase a different terminal or upgrade services, the user is forced to return to the dealer to provision, or re-provision the terminal. More recent and advanced provisioning systems have made it possible to allow the user to initiate provisioning from the device. For example, a user may manually initiate provisioning from the device to be provisioned. Further, remote servers may instigate a communications session with a provisioning server device, and provide the provisioning server with provisioning information. For example, two existing standards for remote configuration of terminals are the WAP provisioning protocol and the SyncML device management protocol. However, both of these standards assume that components required to be configured are already existing on the mobile terminal. Other systems focus solely on the delivery of data objects to the mobile terminal.

Existing methodologies for provisioning mobile terminals thus currently involve multiple actions and multiple interfaces to the network service providing the application. This complicates provisioning, particularly where new service and utility network elements increasingly proliferate the networks.

Accordingly, there is a need in the network communications industry to unify various provisioning procedures in a common network system, in order to expedite and simplify the provisioning procedures for the network services providing applications. The present invention solves these and other shortcomings of the prior art, and offers numerous advantages over prior art provisioning systems and methodologies.

SUMMARY OF THE INVENTION

The present invention is directed to a system and method for provisioning mobile clients on a network via a provisioning Web service.

In accordance with one embodiment of the invention, a method is provided for provisioning mobile terminals for use of applications offered by one or more network services on a network. The method includes interfacing at least one mobile terminal to at least one network service via a provisioning Web service. The provisioning Web service provides a single point of interface to the network service for provisioning the mobile terminal. The mobile terminal is provisioned by the provisioning Web service for use of at least one application provided by the network service, where the provisioning includes at least configuring the mobile terminal for use of the application, and delivering the application to the mobile terminal.

In accordance with another embodiment of the invention, a system is provided for provisioning mobile terminals for use of applications provided by network service providers on a network. The system includes a Web service interface coupled between the mobile terminals to be provisioned and the network service providers. The Web service interface serves as a single interface to the network service providers providing the applications, and serves to control the provisioning procedures. The system also includes a Web service mobile terminal configuration module coupled to the Web service interface, to configure the mobile terminals for use of the applications as part of the provisioning procedures. A Web service data object delivery module is also provided, which is coupled to the Web service interface to deliver the applications to successfully configured mobile terminals as part of the provisioning procedures.

In accordance with another embodiment of the invention, a system is provided for provisioning mobile terminals operable on a network. The system includes at least one mobile terminal coupled to the network, and at least one network service coupled to the network to provide an application via the network. A provisioning Web service is provided, which is coupled to the mobile terminal and the network service to control provisioning of the terminal via a single interface to the network service. The provisioning Web service carries out the provisioning by configuring application use settings on the mobile terminal and delivering the application to the mobile terminal.

In accordance with yet another embodiment of the invention, a system including a suite of Web services is provided to provision a terminal for use of an application on a network. The suite of Web services includes a client provisioning Web service to interface at least one mobile terminal to at least one network service. The client provisioning Web service provides a single point of interface to the network service for provisioning the mobile terminal for use of the application provided by the network service. A terminal management Web service configures application use settings on the mobile terminal to enable use of the application. A presence Web service connected via the network to the mobile terminal receives a terminal type of the mobile terminal. A delivery Web service is coupled to the presence Web service to receive the terminal type from the presence Web service, and to identify a data object for delivery corresponding to the terminal type upon successful configuration of the application use settings on the mobile terminal. A notification Web service is coupled to the delivery Web service to deliver the data object to the mobile terminal if the terminal type indicates that the mobile terminal is capable of receiving the data object via a push operation. If the mobile terminal is not capable of receiving the data object via a push operation, the notification Web service delivers to the mobile terminal an address of the data object stored at the delivery Web service.

The above summary of the present invention is not intended to describe each illustrated embodiment or implementation of the present invention. This is the purpose of the figures and the associated discussion which follows.

BRIEF DESCRIPTION OF THE DRAWINGS

The invention is described in connection with the embodiments illustrated in the following diagrams.

DETAILED DESCRIPTION OF THE ILLUSTRATED EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

The present invention is directed to a system and method for provisioning mobile clients on a network via a provisioning Web service. The provisioning Web service in accordance with the present invention provides a single interface to network services wanting to effect provisioning procedures for mobile terminals requesting network service applications. The provisioning Web service unifies provisioning procedures, such as configuring mobile terminals and delivering requested applications, into a common Web service. The provisioning Web service of the present invention may be used in connection with network service applications employing Web service applications, but is also equally applicable to network service applications that do not employ Web service applications.

Figure 1:
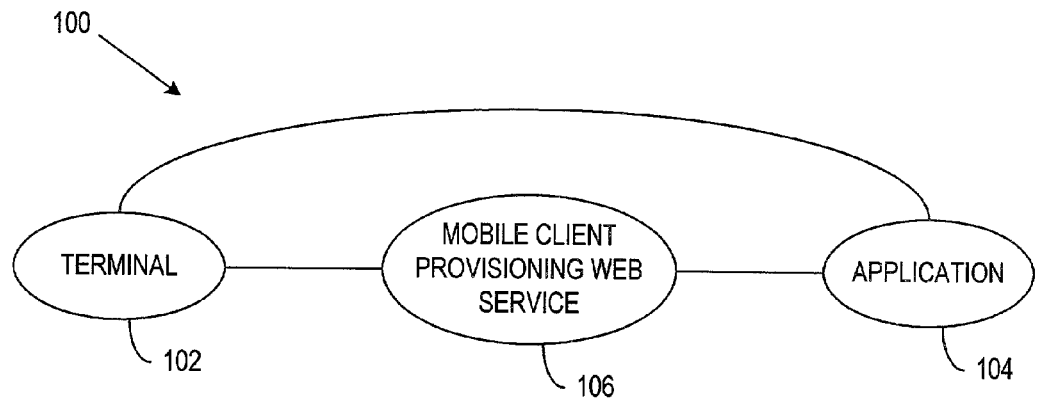
FIG. 1 is an exemplary embodiment of a network system providing a provisioning interface for controlling a provisioning process.

FIG. 1 is an exemplary embodiment of a network system 100 which provides a provisioning interface for controlling a provisioning process. The invention provides a single interface to services desiring to correctly manage and configure mobile terminals. For example, a terminal 102 that is not currently configured for use of an application 104 can be configured for such use, through a provisioning process. A provisioning interface 106 manages the provisioning process between the application 104 and the terminal 102.

Provisioning generally refers to activating one or more telecommunication services for use on a device, and involves programming various network databases with the user's information. It is the creation of an active subscriber account, or modification of parameters for an existing subscriber account, to configure the terminal for use with the desired service(s). For example, provisioning of a subscriber account may include subscriber account registration and device activation.

In accordance with an exemplary embodiment of the present invention, the provisioning interface 106 is provided in the context of a "Web service." Web Services are network-based (particularly Internet-based) modular applications that perform a specific task and conform to a specific technical format. Web services are represented by a stack of emerging standards that describe a service-oriented, component-based application architecture, collectively providing a distributed computing paradigm having a particular focus on delivering services across the Internet. Generally, Web services are self-contained modular applications that can be published in a ready-to-use format, located, and invoked across the World Wide Web. When a Web service is deployed, other applications and Web services can locate and invoke the deployed service. They can perform a variety of functions, ranging from simple requests to complicated business processes.

Advantageously, Web services are accessed via ubiquitous Web protocols and data formats, such as Hypertext Transfer Protocol (HTTP) and Extensible Markup Language (XML). Thus, at present, the basic Web service platform is XML plus HTTP. XML is a text-based markup language that is currently used extensively for data interchange on the Web. As with HTML, data is identified using tags, which are collectively known as "markup". XML tags identify the data, and act as a field name in the program. XML is a language that allows complex interactions between clients and services, as well as between components of a composite service, to be expressed. HTTP is an application protocol, and more particularly is a set of rules for exchanging files (text, graphic images, sound, video, and other multimedia files) on a network such as the World Wide Web. While the examples set forth herein are generally described in connection with XML and HTTP, it should be recognized that this is for illustrative purposes, and current and future types of protocols and data formats may also be employed.

More specifically, Web services represent a collection of several related technologies, and involve connections between at least two applications, such as a remote procedure call (RPC), in which queries and responses are exchanged in XML over HTTP. Web service technologies may be defined in terms of various technology layers. The core layers include a transport layer, such as TCP/IP or HTTP as previously described, in which XML messages may be communicated. An XML messaging layer, such as Simple Object Access Protocol (SOAP) also represents a core layer of Web services. SOAP is a protocol specification that defines a uniform manner of passing XML-encoded data, as well as defines a manner to perform RPCs using HTTP as the underlying communication protocol.

Higher level layers of the Web services stack include a service discovery layer, which may include technologies such as the Web Services Description Language (WSDL) and Universal Description, Discovery, and Integration (UDDI). WSDL is an XML-based description defining how to connect to a particular Web service, and thus indicates how service providers are to describe the basic format of Web service requests over different protocols or encodings. It is used to describe what a Web service can do, where it resides, and how to invoke it. UDDI provides a manner in which clients can dynamically locate other Web services. It represents a set of protocols and a public directory for the registration and real-time location of Web services and other business processes. UDDI provides a manner for Web service providers to register themselves, and provides a manner for an application to find, connect to, and interact with a particular Web service.

Other higher level layers of the Web services stack may include a workflow layer. A workflow layer may include a technology such as the Web Services Flow Language (WSFL). WSFL is an XML language for the description of Web Services compositions. It allows for recursive compositions of Web services within others to create more complex features built upon existing Web services.

The aforementioned, and other, technologies, protocols, data formats, etc. may be used in employing Web services. However, these known technologies are referenced in order to provide exemplary technologies currently available in the development and use of Web services. The invention thus may utilize these known technologies, but is also applicable to other existing and/or future technologies, as will be readily apparent to those skilled in the art from an understanding of the description provided herein.

In accordance with one embodiment of the invention, the provisioning interface 106 of FIG. 1 is a mobile client provisioning Web service. The Web service 106 is capable of provisioning mobile clients 102 to use applications/services 104 on the Internet/intranet.

Figure 2:
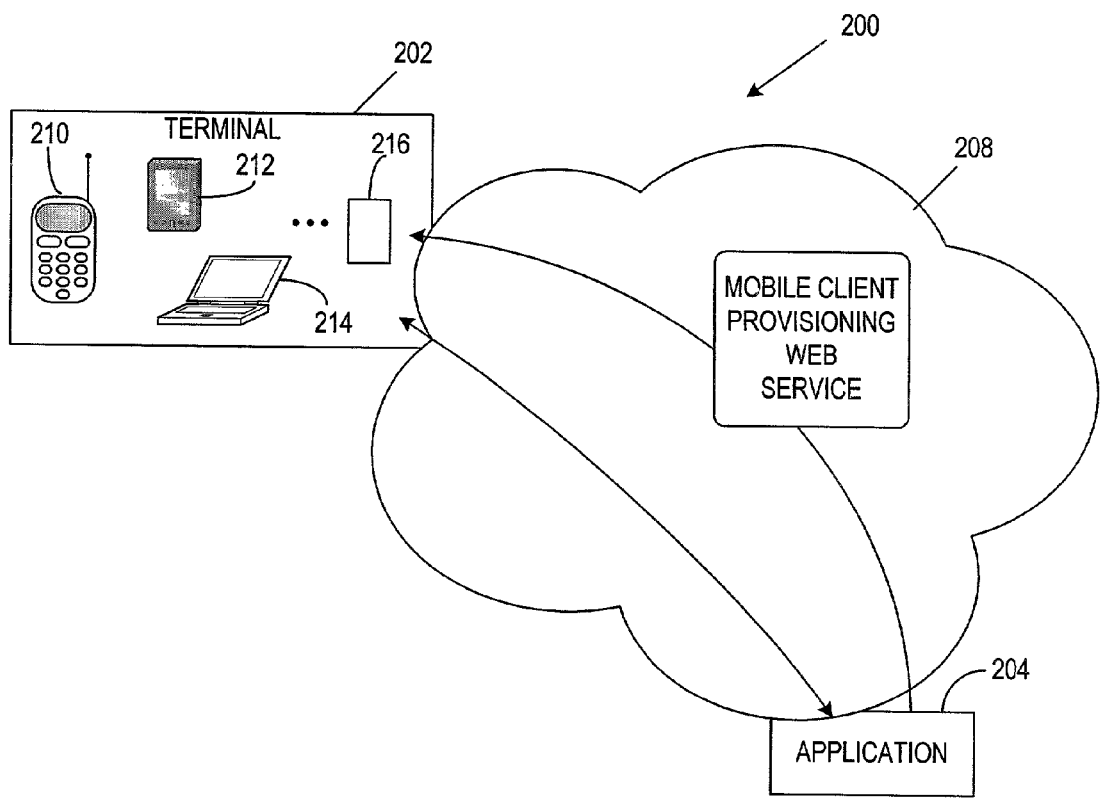
FIG. 2 illustrates an exemplary embodiment of a network system architecture providing a mobile client provisioning Web service in accordance with the present invention.

FIG. 2 illustrates an exemplary embodiment of a network system architecture 200 providing a mobile client provisioning Web service in accordance with the present invention. The exemplary embodiment of FIG. 2 includes one or more mobile terminals 202, at least one application 204, and the mobile client provisioning Web service 206. These network elements communicate over any one or more cooperating wireless and landline networks 208.

The wireless terminals 202 may include any type of mobile computing device. For example, the wireless terminal 202 may represent any of a number of mobile communication devices, such as a cellular telephone 210, a personal digital assistant (PDA) 212, a notebook or laptop computer 214, or any other type of terminal represented by device 216. An unprovisioned terminal 202 is one that has not undergone a configuration of initial device/infrastructure connection parameters from a storage location to the terminal.

The application 204 can be any application that a mobile terminal (e.g., terminal 202) wishes to use. The application 204 thus may, but need not, be a Web service itself. For example, the application 204 may be a Java™ application which is accessed by a MIDlet on the mobile terminal 202. As is known in the art, a MIDlet is an application that conforms to the MIDP standard. MIDP (Mobile Information Device Profile) is a set of Java Application Programming Interfaces (APIs) that define how software applications interface with mobile devices such as wireless telephones, pagers, Personal Digital Assistants (PDAs), etc. Applications conforming to this standard are referred to as MIDlets, which are applications written using the MIDP framework that can be stored and operated on a mobile device. A variety of other types of applications 204 capable of using Web service technologies may also be used in connection with the invention.

The mobile client provisioning Web service 206 serves as an interface for the application(s) 204 to provision the terminal(s) 202. The provisioning Web service 206 provides a single point of interface to the application(s) 204, and manages automatic configuration of the terminals 202, including providing the appropriate configurations to the terminal as well as providing the appropriate applications to the terminal. Thus, in accordance with the invention, the provisioning service 206 provisions the mobile client 202 on behalf of the application 204, resulting in a terminal 202 provisioned to use the service provided by the application 204.

Figure 3:
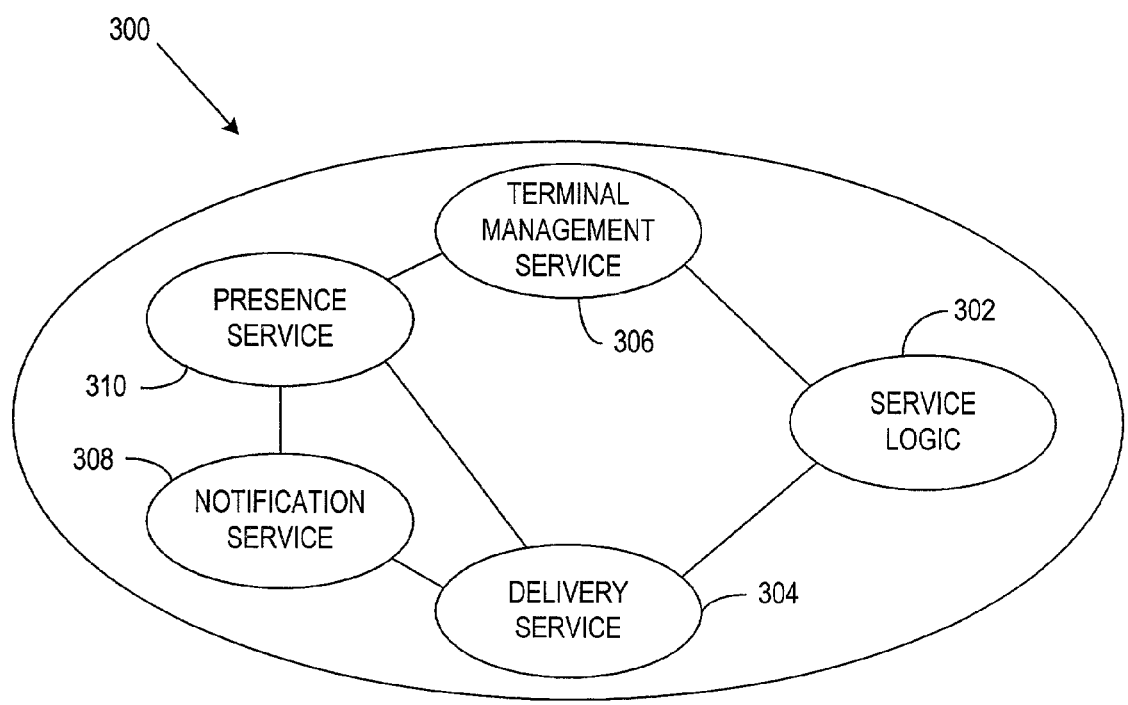
FIG. 3 is a block diagram illustrating an exemplary embodiment of a mobile client provisioning Web service in accordance with the invention.

FIG. 3 is a block diagram illustrating an exemplary embodiment of a mobile client provisioning Web service 300 in accordance with the invention. The internal architecture of the illustrated Web service 300 includes service logic 302, a delivery service 304, a terminal management service 306, a notification service 308, and a presence service 310.

The service logic 302 provides various functionality for the mobile client provisioning Web service 300. One function is to provide the Web services endpoint, which terminates the Web services protocols. Another function of the service logic 302 is to provide the logic that ties the components of the Web service 300 together to ultimately provide the Web service 300. This includes making use of the component services, in the appropriate sequence, to ensure that the mobile terminal is correctly provisioned.

The delivery service 304 is responsible for ensuring the correct delivery of objects required by the mobile terminal to access the application for which the provisioning is taking place. Various functions are associated with this task. A first function includes determining the correct variant of the data object to deliver, based on the type of the mobile terminal. Another function includes delivering the data object to the terminal, and provides for various delivery options including push delivery, pull delivery, etc. The delivery service 304 may also provide network edge caching facilities for the mobile terminal in connection with the delivery of the data objects.

The terminal management service 306 is responsible for remotely configuring parameters in the terminal in order to allow it to access the application. These parameters may be of multiple varieties. For example, a first type of parameters includes those parameters associated with any data objects delivered by the delivery service 304. A second type of parameters includes existing parameters on the terminal that may require some sort of modification. For example, a banking application may require a terminal to have Wireless Application Protocol (WAP) connectivity settings that allow connectivity through the bank's WAP gateway for security reasons.

The notification service 308 works in conjunction with the delivery service 304 to deliver data objects to the terminal. In one embodiment, the notification service 308 can be used as the delivery channel directly to deliver the data object to the terminal. This is possible, for example, where the terminal is capable of receiving the data object via a push channel, such as via Multimedia Messaging Service (MMS) messaging. MMS is a standard being defined for use in advanced wireless terminals, which allows for non-real-time transmission of various kinds of multimedia contents such as images, audio, video clips, etc. In a second embodiment, the notification service 308 delivers a notification to the terminal indicating an address where the data object can be retrieved via a pull channel. The notification service 308 may provide additional types of notifications in accordance with the invention.

Also part of an exemplary embodiment of the mobile client provisioning Web service 300 is a presence service 310. The presence service 310 provides information to the other services in the system. One primary piece of information provided by the presence service 310 is the terminal type which is to be provisioned. In one embodiment, the presence service 310 provides its services to the delivery service 304, the notification service 308, and the terminal management service 306.

Figure 4:
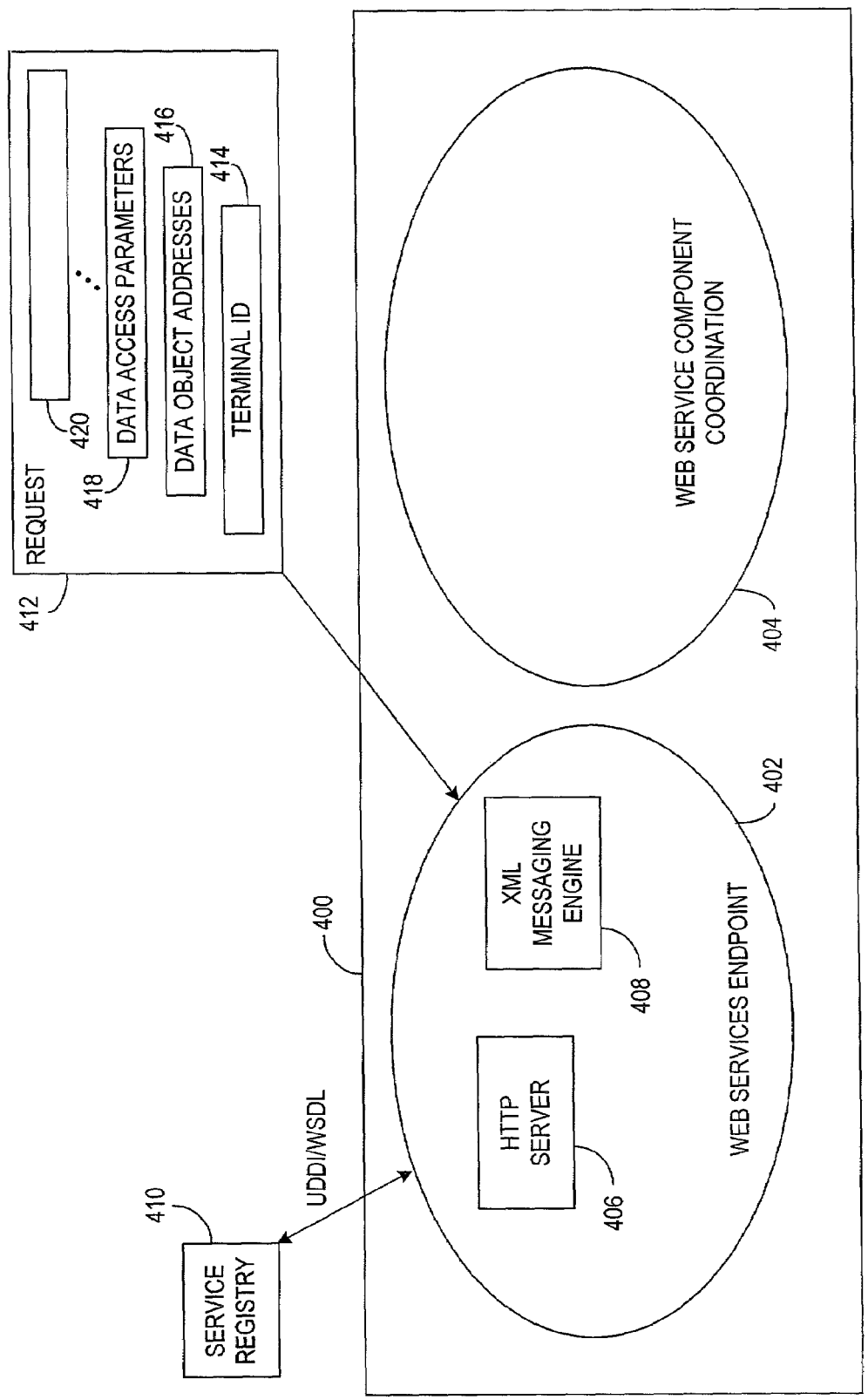
FIG. 4 is a block diagram of a more particular embodiment of a service logic module in accordance with the present invention.

FIG. 4 is a block diagram of a more particular embodiment of a service logic module 400 in accordance with the present invention. In the illustrated embodiment, the service logic module 400 includes a Web services endpoint module 402 and the Web service component coordination module 404. The Web services endpoint module 402 terminates the Web services protocols. In one embodiment, the Web services endpoint module 402 includes a transport layer server, such as an HTTP server 406. The Web services endpoint also includes an XML messaging engine 408, such as that provided by SOAP to parse incoming requests and generate appropriate responses. The Web services endpoint module 402 of FIG. 4 also interfaces with a service registry 410 in order to advertise the mobile client provisioning Web service using, for example, the UDDI protocol and the WSDL definition language.

The Web service endpoint module 402 allows applications to make requests to provision mobile clients. The provisioning requests, such as the illustrated provisioning request 412, may include various items. These request items may include an identification of the provisioned terminal, including known or future terminal identification parameters. For example, this terminal identification (ID) 414 may include an IP address, a user name, an International Mobile Subscriber Identity (IMSI), an International Mobile Equipment Identity (IMEI), a Mobile Station ISDN/PSTN Number (MSISDN), or any other identification associated with the terminal. For example, the IMEI is a parameter that uniquely identifies an individual wireless phone or communicator. Generally, the IMEI appears on the label located on the back of the phone, and is automatically transmitted by the phone when the network asks for it. The IMSI generally refers to the primary number used to identify a user on a GSM network, and is typically used in conjunction with the mobile telephone network for call routing. The MSISDN is a mobile number used by GSM/DCS networks that contains information such as the country code, national destination code, HLR identifier and a subscriber number. Any of these types of terminal IDs may be included in the provisioning request to identify the terminal, as can other types of terminal IDs. Thus, the aforementioned terminal IDs are representative, but the invention is clearly not limited to these particular examples described.

Other items included in the provisioning requests include addresses 416 of data objects that are to be delivered in order to provision the terminal. For example a mobile games service could be accessed via a MIDlet on the terminal. This data object address field would contain the address where the MIDlet is located on the network. In one embodiment, this address may be provided via a URL. In addition, there may be different addresses provided to account for variants in the data objects to accommodate different terminal types.

Still other items that may be included in the provisioning requests include data parameters 418 for the terminal to access the application. This may include, for example, the address of the application. In a Wireless Application Protocol (WAP) context, these data parameters may include the WAP settings required to provide connectivity to the application.

Any number of other items 420 may also be included in the provisioning request, depending on the particular protocols, data formats, networking environments, or other conditions relevant to the particular setting.

Another function of the service logic module 400 is to provide the logic that ties the components of the Web service together to ultimately provide the Web service. This includes making use of the component services, in the appropriate sequence, to ensure that the mobile terminal is correctly provisioned. This functionality is provided by the Web service component coordination module 404.

Figure 5:
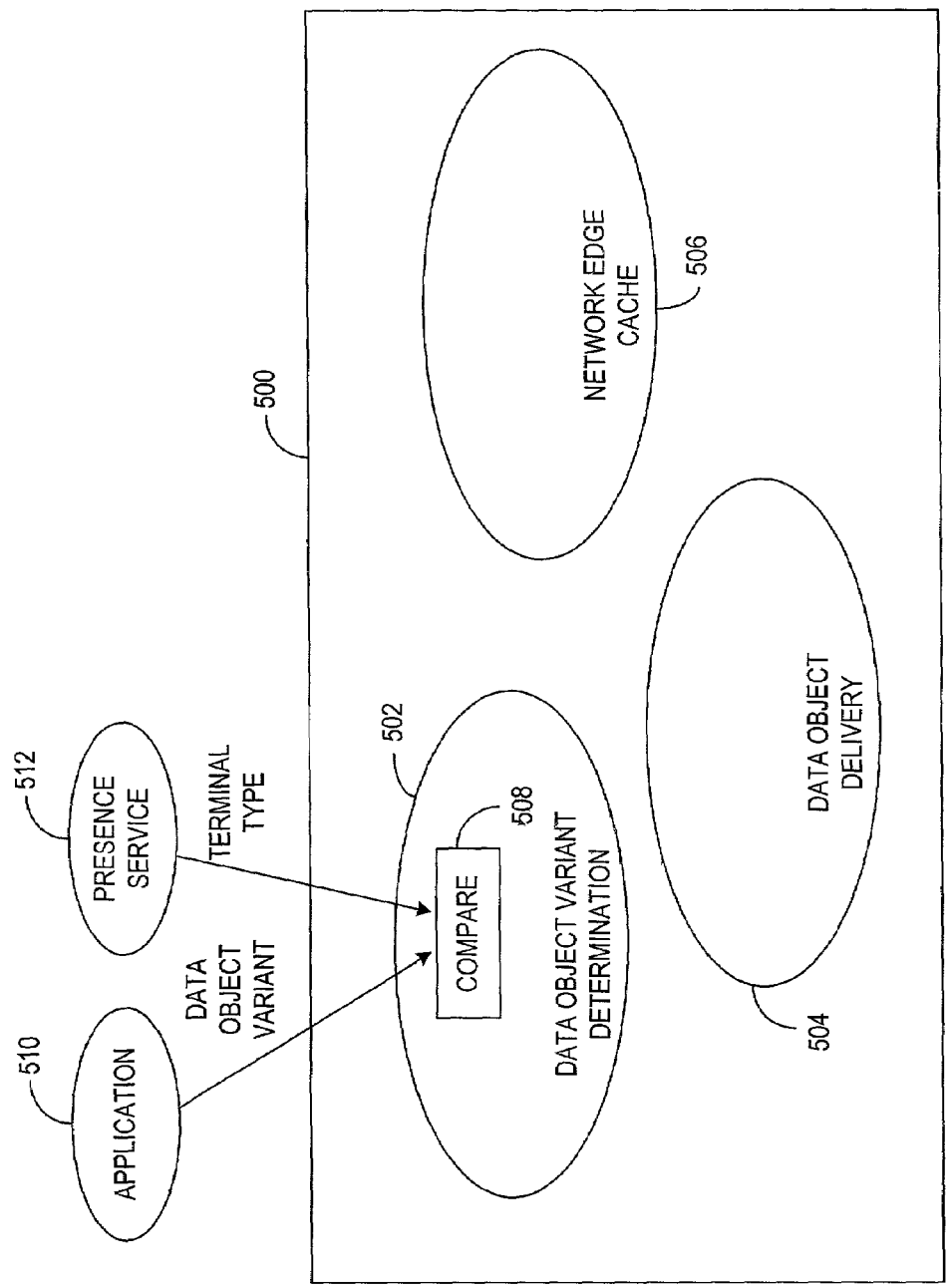
FIG. 5 is a block diagram of a more particular embodiment of a delivery service module in accordance with the present invention.

FIG. 5 is a block diagram of a more particular embodiment of a delivery service module 500 in accordance with the present invention. The delivery service 500 ensures the correct delivery of any objects required by the mobile terminal to access the application for which the provisioning is taking place. This service provides various functions. In the illustrated embodiment, the delivery service module 500 includes a data object variant determination module 502, a data object delivery module 504, and a network edge cache module 506.

A first function of the delivery service 500 is to determine the correct variant of the data object to deliver, based on the type of the mobile terminal. This function is represented in FIG. 5 by the data object variant determination module 502. For example, different data objects may need to be delivered to different types of mobile terminals, and the data object variant determination module 502 performs this analysis. In one embodiment, a comparing module 508 associated with the data object variant determination module 502 determines the correct object to deliver by comparing the data object variant offered by the application 510 with the terminal that is being provisioned. The delivery service 502 determines the appropriate terminal type from a presence service 512, which corresponds to the presence service 310 described in connection with FIG. 3. The comparing module 508 may be implemented using hardware, software, or a combination thereof.

Upon determining the correct data object variant to deliver, the delivery service 500 delivers the data object to the terminal. This function is represented in FIG. 5 by the data object delivery module 504. The module 504 may be equipped with multiple delivery options. For example, the data object delivery module 504 may be configured to deliver the data object via a push service, a pull service, or other delivery methodology. If, for example, the terminal is capable of receiving the data object over a push channel, the data object delivery module 504 can make use of the notification service (e.g., notification service 308 of FIG. 3) directly to deliver the object to the terminal. Terminals capable of Multimedia Messaging Service (MMS) messaging, for example, may be capable of receiving the data objects through such a push channel. If the terminal is not capable of such functionality, the data object delivery module 504 of the delivery service 500 instructs the notification service to deliver a notification containing the address where the terminal can download the data object via a pull service. This address would point to an endpoint, such as an HTTP endpoint, within the delivery service.

Further, the delivery service 500 may include a network edge cache 506. This provides network edge caching facilities for the mobile terminal in the delivery of the data objects. The use of such a caching facility can enhance data throughput and improve the delivery time from the terminal's point of view.

Figure 6:
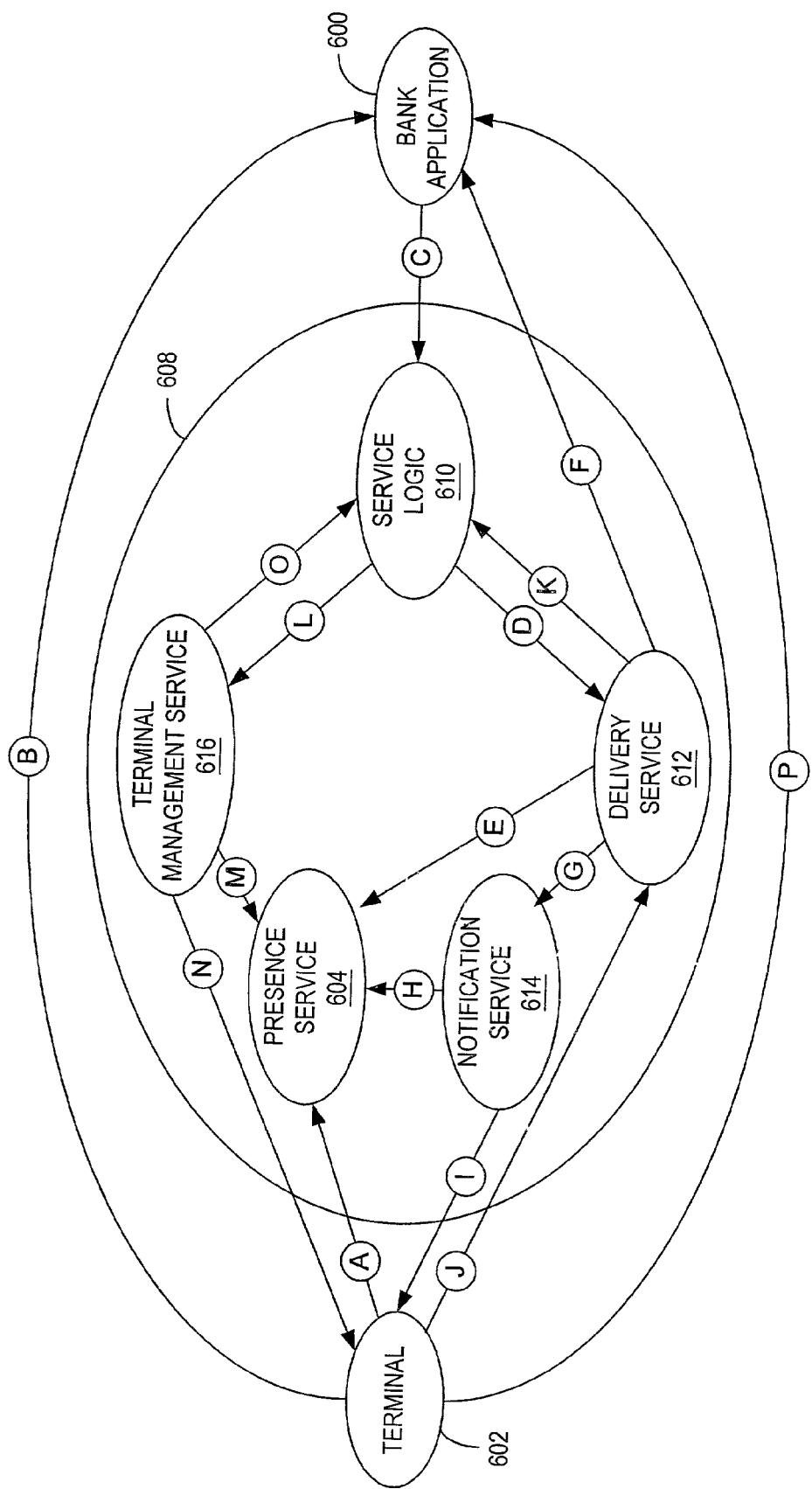
FIG. 6 is a block diagram of an exemplary provisioning procedure carried out in accordance with the mobile client provisioning Web service in accordance with the present invention.

FIG. 6 is a block diagram of an exemplary provisioning procedure carried out in accordance with the mobile client provisioning Web service in accordance with the present invention. The example illustrates one embodiment in which the mobile client provisioning Web service is used to provision mobile clients to use applications and services available on an intranet/Internet.

In this example, the application is assumed to be a banking application 600 for purposes of illustration. This banking application 600 allows users to engage in banking transactions via a mobile terminal 602. While the application 600 may be written in any desired programming language capable of being accessed via the terminal 602, the present example assumes that the bank application 600 is written in the Java™ programming language, and can be accessed from a mobile client 602 using a Java MIDlet communicating over a WAP transport layer. The sequence of events that follows is one representative example of a provisioning procedure implementing a mobile client provisioning Web service in accordance with the present invention. This example is provided for purposes of explaining a representative example only, and the invention is not limited thereto.

The terminal 602 establishes a connection to the network. The network may include various communicating landline and wireless networks. As shown by connection A, the terminal 602 contacts the presence service 604 of the mobile client provisioning Web service 608. The presence service 604 provides information to the other services in the system, and therefore the terminal 602 contacts the presence service 604 to supply information about the terminal 602 for subsequent distribution to other elements of the provisioning Web service 608. By contacting the presence service 604, the terminal 602 notifies the presence service 604 that the terminal 602 is connected to the network, and also relays information about the terminal. Such information may include, for example, the terminal type, storage capacity, and other information characteristic of the terminal 602.

After connecting to the network, the user of the terminal 602 may choose to utilize the application 600, which in this example is a banking service. The terminal 602 contacts the bank application as shown by connection B via its user interface, such as a WAP browser. Because this example assumes the terminal 602 has not yet been provisioned to use the application 600, the terminal 602 will not contain the software module (e.g., MIDlet) required to access and use the application 600.

Upon contact by the terminal 602, the application 600 recognizes that the terminal 602 is unprovisioned, and thus contacts the mobile client provisioning Web service 608 as shown by connection C. The bank application 600 makes this contact to the service logic module 610, and instructs it to provision the terminal 602 so that the terminal 602 can access and use the bank application 600. Along with notifying the service logic module 610 to initiate the provisioning process within the provisioning Web service 608, the application 600 provides information to the service logic module 610 that can be used in the provisioning. For example, the application 600 supplies the terminal address determined by the application 600 when the terminal 602 contacted the application 600. Further, the application 600 will supply information regarding the application and how it is to be accessed, such as the application address, the application MIDlet location, and the WAP settings required to use the bank application 600.

In response, the service logic module 610 instructs the delivery service module 612 that it is to deliver the MIDlet to the terminal 602, as illustrated by connection D. Before actually delivering the MIDlet, various actions are taken by the delivery service 612 to obtain the appropriate MIDlet from the application 600, and determine an appropriate delivery method. The delivery service 612 queries the presence service 604, as illustrated by connection E, for the terminal type that was previously provided by the terminal 602. In this example, it is assumed for purposes of discussion that the terminal 602 has only WAP and Java capabilities. This information is provided to the delivery service 612, which in response retrieves the appropriate MIDlet from the bank application as shown by connection F. The delivery service 612 then temporarily stores the retrieved MIDlet, and prepares for further delivery of the MIDlet to the requesting terminal 602.

From the terminal type information previously provided by the presence service 604 to the delivery service 612, the delivery service determines, for example, that the terminal 602 is not capable of direct delivery of the MIDlet. This can be a due to the terminal's inability to support direct delivery messaging, such as MMS. In this case, the delivery service 612 contacts the notification service 614, as illustrated by connection G. The delivery service 612 instructs the notification service 614 to deliver a notification that the bank MIDlet is available at the delivery service address.

The notification service 614 queries the presence service 604 as shown by connection H, and determines that the terminal 602 is capable of a WAP push. Push technology is the active transmission or "pushing" of data to registered receivers within a network. A push message may contain different data types, such as Service Initiator (SI) and Service Loading (SL), both of which are XML-applications like WML. SI sends an alert that data in the form of a WML-document is available for downloading, and is generally in the form of a short message and a Uniform Resource Identifier (URI) indicating a service. SL may interrupt other activities and force a message to be fetched automatically from the assigned server and then displayed by the browser.

Based on the knowledge that the terminal 602 is capable of a WAP push, the notification service 614 constructs a WAP SI with the delivery service 612 address, in accordance with one embodiment of the invention. This SI includes instructions to the terminal 602 to download the MIDlet from the delivery service 612 using the delivery service address. The notification service 614 sends this notification to the terminal 602 as illustrated by connection I.

After receiving the notification from the notification service 614, the terminal 602 downloads the MIDlet from the delivery service 612 as shown by connection J. As indicated by connection K, the delivery service 612 informs the service logic module 610 that the MIDlet has been successfully delivered to the terminal 602. As illustrated by connection L, the service logic module 610 then instructs the terminal management service 616 to modify the terminal's 602 WAP settings to allow it to use the settings required by the bank application. For example, the terminal's WAP settings may be modified to use the bank's WAP gateway. As previously described, the terminal management service 616 can remotely configure parameters in the terminal in order to allow it to access the application. One of the various types of parameters includes existing parameters on the terminal that may require some sort of modification, such as modifying the terminal settings to have WAP connectivity settings to allow connectivity through the bank's WAP gateway for security reasons. Thus, the terminal management service 616 is notified by the service logic module 610 to effect such a terminal setting modification where required.

In order to carry out this modification, the terminal management service 616 may query the presence service 604, as shown by connection M. This query is to obtain information regarding the terminal 602, which the presence service previously acquired as shown at connection A. Based on this information, the terminal management service 616 configures the WAP settings on the terminal 602, as illustrated by connection N, so that it is able to appropriately connect to the bank application 600. As shown by connection O, the terminal management service 616 then informs the service logic module 610 that the terminal parameters in the terminal have been appropriately configured.

At this point, the provisioning is complete for the exemplary embodiment of FIG. 6. As illustrated by connection P, the terminal 602 may use the acquired MIDlet over the modified WAP settings to connect to the bank application 600, and the user is thus able to perform the desired banking operations.

In one embodiment of the invention, the provisioning Web service interface of the present invention may be implemented as a single Web service. In such an embodiment, at least the various cooperating modules 604, 610, 612, 614, and 616 are provided in a single Web service. Such an implementation of a provisioning Web service may be effected, for example, as Enterprise JavaBeans (EJB) in a Java™ 2 Enterprise Edition (J2EE) application container. As is known in the art, EJB is an object-oriented programming interface that facilitates creation of reusable applications or program building blocks called "components," which can be deployed in a network. J2EE is a high level of packaging of Java™ libraries and specifications for application server functions. A server meeting the J2EE specifications can support multi-tier applications that work with web browsers and network applications on the client side, and a variety of databases on the enterprise side.

In an alternative embodiment, a set of Web services may comprise the mobile client provisioning Web service of the present invention. An implementation based on such a set of Web services provides at least the advantages that the provisioning Web service is more modular and the individual components are available for other services as well. In one embodiment of the invention, such a set of Web services includes at least the mobile client provisioning Web service that includes the service logic module, a delivery Web service, a terminal management Web service, a notification Web service, and a presence Web service. Therefore, the provisioning Web service 608 embodiment described in connection with FIG. 6 may be implemented as a single Web service, or as a set of independent Web services. Still further embodiments of the provisioning Web service 608 may include a plurality of Web services, where some of the modules of the provisioning Web service 608 are grouped together into the plurality of Web services.

Figure 7:
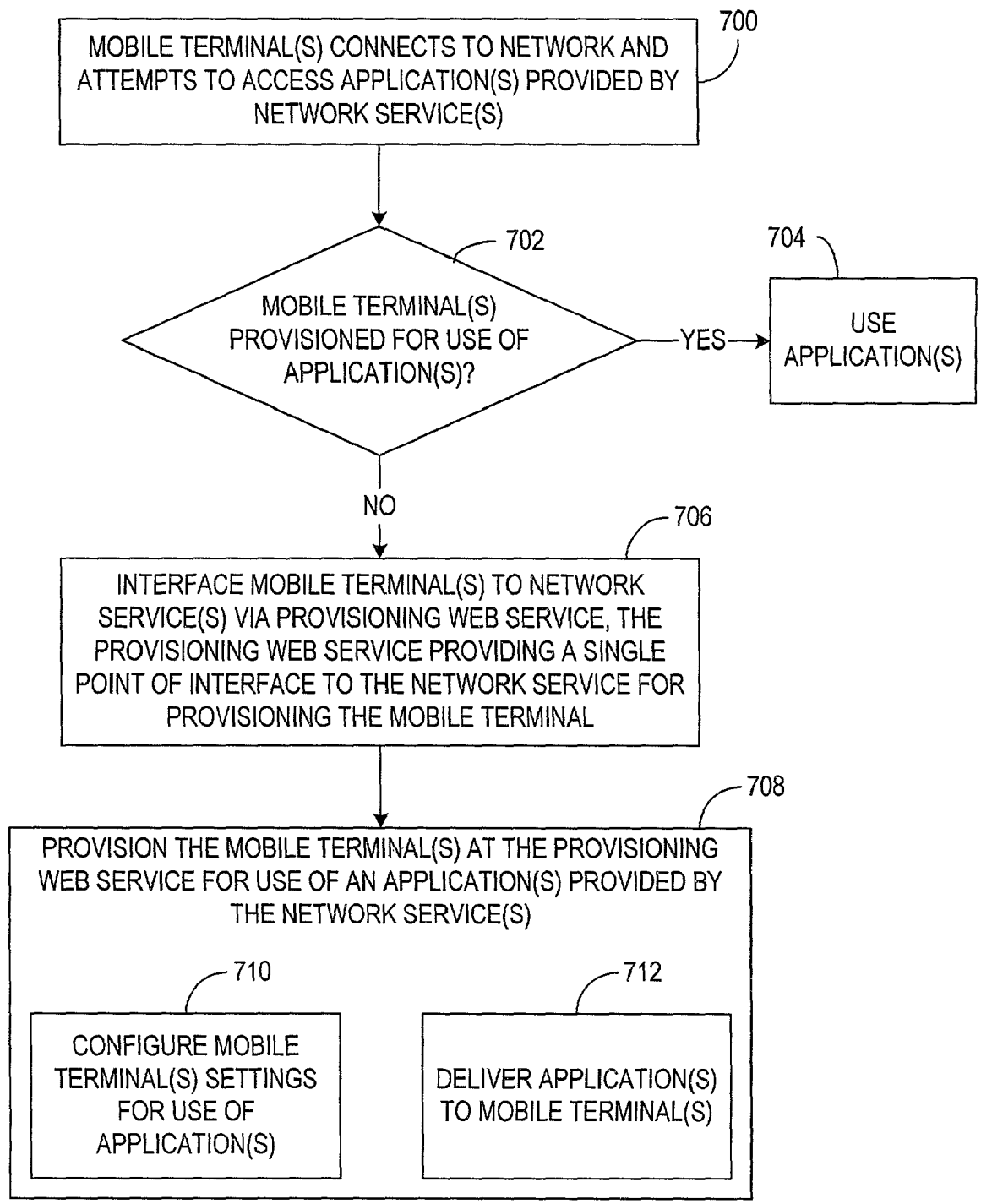
FIG. 7 is a flow diagram of one embodiment of a method for provisioning mobile terminals using a Web service in accordance with the present invention.

FIG. 7 is a flow diagram of one embodiment of a method for provisioning mobile terminals using a Web service in accordance with the present invention. As illustrated at block 700, one or more mobile terminals connect to the network, and attempt to access applications made available on the network by one or more network services. If the mobile terminal has been provisioned for use of the requested applications as determined at decision block 702, then the mobile terminal can access and use 704 the requested applications. However, if the mobile terminal has not been provisioned for use of the applications, a provisioning Web service in accordance with the present invention is employed to carry out the requisite provisioning.

More particularly, the provisioning Web service interfaces 706 the mobile terminal(s) and the network service(s). In the illustrated embodiment, the provisioning Web service serves as a single point of interface for the network service(s) to provision the requesting mobile terminals. The mobile terminal is provisioned 708 at the provisioning Web service for use of the requested application(s) provided by the respective network service(s).

In accordance with one embodiment of the invention, the provisioning Web service serves as a single interface for the network services, and also performs all provisioning operations. This advantageously minimizes the provisioning intelligence required by the network services, and eliminates any need for the network services(s) to interface with multiple network devices to carry out various distinct aspects of a provisioning process. In accordance with the illustrated embodiment of FIG. 7, the Web service unifies performance of all provisioning functions. More particularly, the provisioning Web service according to the illustrated embodiment configures 710 the mobile terminal settings for use of the desired applications, as well as delivers 712 the application(s) to the mobile terminal.

It should be recognized that the aforementioned embodiments are representative examples of the various automatic detection and notification principles described herein, and the invention is not limited to these illustrated embodiments.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using, or selling the invention.

Memory devices include, but are not limited to, hard disk drives, diskettes, optical disks, magnetic tape, semiconductor memories such as RAM, ROM, PROMS, etc. Transmitting devices include, but are not limited to, the Internet, intranets, telephone/modem-based network communication, hardwired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out the method of the invention.

It will, of course, be understood that various modifications and additions can be made to the various embodiments discussed hereinabove without departing from the scope or spirit of the present invention. For example, the invention may be used in connection with any type of networking environment, ranging from local area networks to proliferative global area networks such as the Internet, and including cooperative landline and mobile networks. From the foregoing description of the illustrated embodiments, those of ordinary skill in the art will readily appreciate the applicability of the invention in any comparable network environment. Accordingly, the scope of the present invention should not be limited by the particular embodiments discussed above, but should be defined only by the claims set forth below and equivalents thereof.

What is claimed is:

1. A system for provisioning mobile terminals operable on a network, comprising:
   at least one mobile terminal coupled to the network;
   a network service coupled to the network to provide an application via the network;
   a provisioning Web service implemented using Web Services and coupled between the mobile terminal and the network service to provide a single interface for the network service to control provisioning of the mobile terminal, and to effect the provisioning by configuring application use settings on the mobile terminal and delivering the application to the mobile terminal;
   wherein the provisioning Web service comprises a data object delivery module to deliver the application to the mobile terminal upon successful configuration of the application use settings on the mobile terminal;
   wherein the provisioning Web service further comprises a notification module coupled to the data object delivery module to notify the mobile terminal that the application is available at the data object deliver module, if the mobile terminal is not capable of direct delivery receipt by the data object delivery module, and to provide an address of the application at the data object delivery module.

2. A system for provisioning mobile terminals operable on a network, comprising:
   at least one mobile terminal coupled to the network;
   a network service coupled to the network to provide an application via the network;
   a provisioning Web service coupled between the mobile terminal and the network service to provide a single interface for the network service to control provisioning of the mobile terminal, and to effect the provisioning by configuring application use settings on the mobile terminal and delivering the application to the mobile terminal; wherein the provisioning Web service comprises:
   (a) a service logic module comprising:
      (i) a Web service endpoint to terminate Web service protocols;
      (ii) a sequence management module to control a sequence of provisioning operations;
   (b) a data object delivery module to deliver the application to the mobile terminal upon successful configuration of the application use settings on the mobile terminal;
   (c) a notification module coupled to the data object delivery module to notify the mobile terminal that the application is available at the data object deliver module, if the mobile terminal is not capable of direct delivery receipt by the data object delivery module, and to provide an address of the application at the data object delivery module;
   (d) a terminal management module to configure the application use settings on the mobile terminal to allow connectivity of the mobile terminal to the network service; and
   (e) a presence module configured to receive terminal information of the mobile terminal that is being provisioned, and to supply the terminal information to one or more of the data object delivery module, the notification module, and the terminal management module during the provisioning of the terminal.

3. A suite of Web services to provision a terminal for use of an application on a network, comprising:
   a memory storing one or more web services;
   a client provisioning Web service to interface at least one mobile terminal to at least one network service, wherein the client provisioning Web service provides a single point of interface to the network service for provisioning the mobile terminal for use of the application provided by the network service;
   terminal management Web service to configure application use settings on the mobile terminal to enable use of the application;

a presence Web service connected via the network to the mobile terminal to receive at least a terminal type of the mobile terminal;

a delivery Web service coupled to the presence Web service to receive the terminal type from the presence Web service, and to identify a data object for delivery corresponding to the terminal type upon successful configuration of the application use settings on the mobile terminal; and a notification Web service coupled to the delivery Web service to deliver the data object to the mobile terminal if the terminal type indicates that the mobile terminal is capable of receiving the data object via a push operation, and to deliver to the mobile terminal an address of the data object stored at the delivery Web service if the terminal type indicates that the mobile terminal is not capable of receiving the data object via a push operation.

* * * * *

UNITED STATES PATENT AND TRADEMARK OFFICE
CERTIFICATE OF CORRECTION

| | | |
|---|---|---|
| PATENT NO. | : 7,506,059 B2 | Page 1 of 1 |
| APPLICATION NO. | : 10/036058 | |
| DATED | : March 17, 2009 | |
| INVENTOR(S) | : Michael Mulligan | |

It is certified that error appears in the above-identified patent and that said Letters Patent is hereby corrected as shown below:

<u>Title page, item [57] in the Abstract</u>

Line 9: "network services" should read --network service,--.

<u>In the Claims</u>

Column 14, Claim 3, line 65: "terminal management" should be --a terminal management--.

Signed and Sealed this

Second Day of June, 2009

JOHN DOLL
*Acting Director of the United States Patent and Trademark Office*